United States Patent
Edwards et al.

(10) Patent No.: US 6,478,138 B1
(45) Date of Patent: Nov. 12, 2002

(54) DOUBLE WIDTH CROSSBELT SORTER

(75) Inventors: Stuart M. Edwards, Milan (IT); Artemio G. Affaticati, Cadeo (IT); Claudio A. Cerutti, Borgomanero (IT)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 110 days.

(21) Appl. No.: 09/675,237

(22) Filed: Sep. 29, 2000

Related U.S. Application Data

(60) Provisional application No. 60/157,504, filed on Oct. 4, 1999.

(51) Int. Cl.$^7$ .............................................. B65G 47/10
(52) U.S. Cl. ................................................. 198/370.06
(58) Field of Search ........................... 198/370.06, 370.1

(56) References Cited

U.S. PATENT DOCUMENTS

| | | | |
|---|---|---|---|
| 3,254,752 A | 6/1966 | Bauch et al. ................. 198/31 |
| 3,550,748 A | 12/1970 | Hauer .......................... 198/38 |
| 3,752,312 A | 8/1973 | Soltanoff .................. 209/111.7 |
| 3,848,728 A | 11/1974 | Leibrick et al. ............ 198/155 |
| 4,781,281 A | 11/1988 | Canziani ..................... 198/365 |
| 4,915,209 A | 4/1990 | Canziani ..................... 198/357 |
| 5,547,084 A | * 8/1996 | Okada et al. ....... 198/370.06 X |
| 5,588,520 A | 12/1996 | Affaticati et al. ...... 198/370.06 |
| 5,868,238 A | 2/1999 | Bonnet ..................... 198/370.1 |
| 5,901,830 A | 5/1999 | Kalm et al. ............ 198/370.06 |
| 6,253,901 B1 | 7/2001 | Hintz et al. ............ 198/370.06 |
| 6,253,904 B1 | 7/2001 | Soldavini .................... 198/431 |

FOREIGN PATENT DOCUMENTS

| | | | | |
|---|---|---|---|---|
| DE | 2717199 A1 | 11/1978 | ........... | B65G/47/34 |
| DE | 4033699 C1 | 12/1991 | ........... | B65G/47/52 |
| EP | 481341 A1 | 4/1992 | ........... | B65G/43/00 |
| EP | 518180 A2 | 12/1992 | ........... | B65H/31/18 |
| EP | 556866 A2 | 8/1993 | ............ | B07C/5/36 |
| EP | 633208 A1 | 1/1995 | ........... | B65G/54/02 |
| EP | 774429 A1 | 5/1997 | ........... | B65G/47/46 |
| EP | 927689 A1 | 7/1999 | ........... | B65G/17/34 |
| FR | 2450765 | 10/1980 | ........... | B65G/47/52 |
| JP | 6127662 | 5/1994 | ........... | B65G/43/08 |
| WO | 0032502 | 6/2000 | | |

OTHER PUBLICATIONS

Commonly assigned, co-pending U.S. patent application, Ser. No. 09/669,170 filed Sep. 25, 2000 by Artemio G. Affaticati and Claudio A. Cerutti.

* cited by examiner

*Primary Examiner*—James R. Bidwell
(74) *Attorney, Agent, or Firm*—Van Dyke, Gardner, Linn & Burkhart, LLP

(57) ABSTRACT

A crossbelt sortation system is provided which includes a pair of side-by-side carrier belts on each of a plurality of transport units movable along a conveying path. The carrier belts may be operable independently or in a synchronized manner, in order to receive packages from one or more induction stations and either discharge the packages at an appropriate discharge station or transfer the package onto the carrier belt at the other side of the transport unit. A control system is operable to determine the destination side of the packages at the induction station and to further determine the availability and appropriateness of the carrier belts of the approaching transport units, in order to determine if an available carrier belt is proper or compatible to receive the next package at the induction station. The present invention thus effectively provides presortation of the packages as they are inducted onto the transport units, such that optimal throughput rates are achieved without the complex presortation processes implemented with the prior art systems. Additionally, the carrier belts of one or two adjacent transport units may be synchronously operated to receive larger packages across the side-by-side carrier belts of a single unit or to receive oversized packages or products at the carrier belts of a pair of adjacent transport units. The carrier belts may be synchronously operated to receive a package and pivot the package as it is inducted onto the transport units, in order to properly orient the package on the transport unit or units. The packages or products may then be discharged at an appropriate discharge chute in a similar manner.

84 Claims, 7 Drawing Sheets

DOUBLE WIDTH CROSSBELT SORTER

CROSS-REFERENCE TO RELATED APPLICATION

The present application claims priority from U.S. Provisional Pat. Application, Ser. No. 60/157,504, filed Oct. 4, 1999 by Artemio Affaticati, which is hereby incorporated in its entirety herein by reference.

BACKGROUND OF THE INVENTION

The present invention relates generally to parcel sortation systems and, more particularly, to parcel sortation systems which support the parcels on transport units which are operable to discharge the parcels from the transport units to selected receiving ports. The transport units include carrier belts which are movable in a direction transverse to the conveying path of the transport units, in order to discharge the parcels to the selected destination port.

Crossbelt sortation systems are known and include a plurality of transport units which are movable along a conveying path between a package induct station and a discharge station or port. The crossbelt sortation systems are able to handle parcels of widely varying characteristics. For example, such systems may be used to sort magazines or envelopes at a postal center, frozen food articles, cellophane wrapped clothing articles, or the like. The crossbelt sortation systems are widely adaptable because the parcels are loaded onto carrier belts of the transport units. The carrier belts are movable generally perpendicular to the conveying path of the transport units, and the parcels are discharged from the units via movement of the carrier belts, after the transport unit has carried the parcel to the appropriate destination along the conveying path.

Additionally, parcels may be inducted to the transport units at various separate locations using a plurality of induction stations. However, only one package may be inducted onto a given transport unit at any time. If multiple induction stations are implemented, the throughput of the system may not be significantly enhanced unless one or more discharge stations are positioned between the induction stations to allow at least some of the transport units to empty their packages before arriving at the second induction station. Otherwise, a package may remain on a transport unit as it passes the second induction station, thereby precluding the transport unit from receiving another package at the second induction station.

It has been proposed to provide crossbelt conveyor units which can receive two packages on the belt of the conveyor unit. The objects or packages may then be discharged at appropriate stations. The crossbelt conveyor units may even be operable to discharge one package to one side of the conveyor unit and the other package to the other side of the conveyor unit. However, in order to properly position the packages at the appropriate side of the conveyor units, the packages need to be properly arranged and sequenced prior to being inducted onto the conveyor units. This requires an additional process of presorting the packages, which reduces the efficiency of the crossbelt sortation system. Also, the conveyor units are not able to receive one package from one side of the conveyor path and another package from an induction station at the other side of the conveyor path.

Double tilt tray units have also been proposed which receive and discharge packages at tilt trays positioned along opposite sides of the transport units. However, the packages must be properly arranged or sequenced prior to being inducted onto the units, since the packages cannot be transferred to or unloaded at the opposite side of the unit.

SUMMARY OF THE INVENTION

The present invention is intended to provide a dual belt crossbelt sorter which has a plurality of sorter or transport units movable along a conveying path. Each transport unit includes a pair of movable belts which are independently operable to receive a package from an induction station, transfer a package to the other belt of the transport unit, and/or discharge a package at an appropriate discharge station. The belts are longitudinally aligned on the sorter unit and movable in a direction generally transverse to the conveying path. The present invention thus provides significantly improved efficiency and throughput of the sortation system, without the need to presort the packages at the induction station.

According to a first aspect of the present invention, a crossbelt sortation system comprises a plurality of transport units which are movable along a conveying path between at least one induction station and at least one discharge station. Each transport unit has side-by-side driven carrier belts. Preferably, the side-by-side driven carrier belts are movable along a path which is orthogonal to the conveying path. Preferably, each of the carrier belts is at least occasionally independently driven from the other of the driven carrier belts. The carrier belts may be synchronously or simultaneously operable to load, transfer or discharge articles of varying sizes.

In one form, the crossbelt sortation system includes a control which is operable to determine a destination of packages at the induction station and an availability status of each carrier belt of each approaching transport unit. The control is operable to move a compatible article onto an appropriate carrier belt. The control may transfer an article on one belt to another belt of the transport unit in order to provide an available and compatible carrier belt for an article at the induction station.

According to another aspect of the present invention, a method of sorting articles comprises providing a crossbelt sortation system, which includes an endless chain of transport units with at least two side-by-side carrier belts, operating at least one induction station to position articles on either or both of the carrier belts, and operating the carrier belts to discharge the articles at an appropriate discharge station. The carrier belts may be independently operable, simultaneously operable and/or synchronously operable to load, transfer, discharge, and/or rotate articles at the carrier belts of one or more appropriate transport units.

In one form, the method further includes the steps of determining an availability status of each carrier belt and a destination of each article at the induction station. The availability status and destination are then compared to determine if the carrier belt and transport unit are compatible and available for each particular article. If a carrier belt is compatible with the article on the induction station, the carrier belt is selected or booked for that particular article. The comparison may be continuously performed for the status of each carrier belt of the transport units and destination of each article at a plurality of induction stations. The method may further determine whether an empty carrier belt has already been selected or booked by another induction station.

In another form, the size, shape and/or orientation of an article may be determined at the induction station. The article then may be loaded onto one or more carrier belts of one or more transport units. The belts may be synchronously activated to rotate, pivot and/or move the article onto both of the carrier belts of a transport unit or two adjacent transport units.

Therefore, the present invention provides a double width or dual crossbelt sortation system which is operable to receive parcels from an induction station at one or two of a pair of movable carrier belts on each conveyor or transport unit. The sortation system thus may receive packages at, transfer packages to, and/or discharge packages from either side of the sortation system. The sortation system effectively pre-sorts the articles by selecting an appropriate belt or belts for each package at induction stations along both sides of the conveyor path. The present invention thus provides improved throughput for the sortation system over the prior art.

DESCRIPTION OF THE PREFERRED EMBODIMENTS

Figure 1:
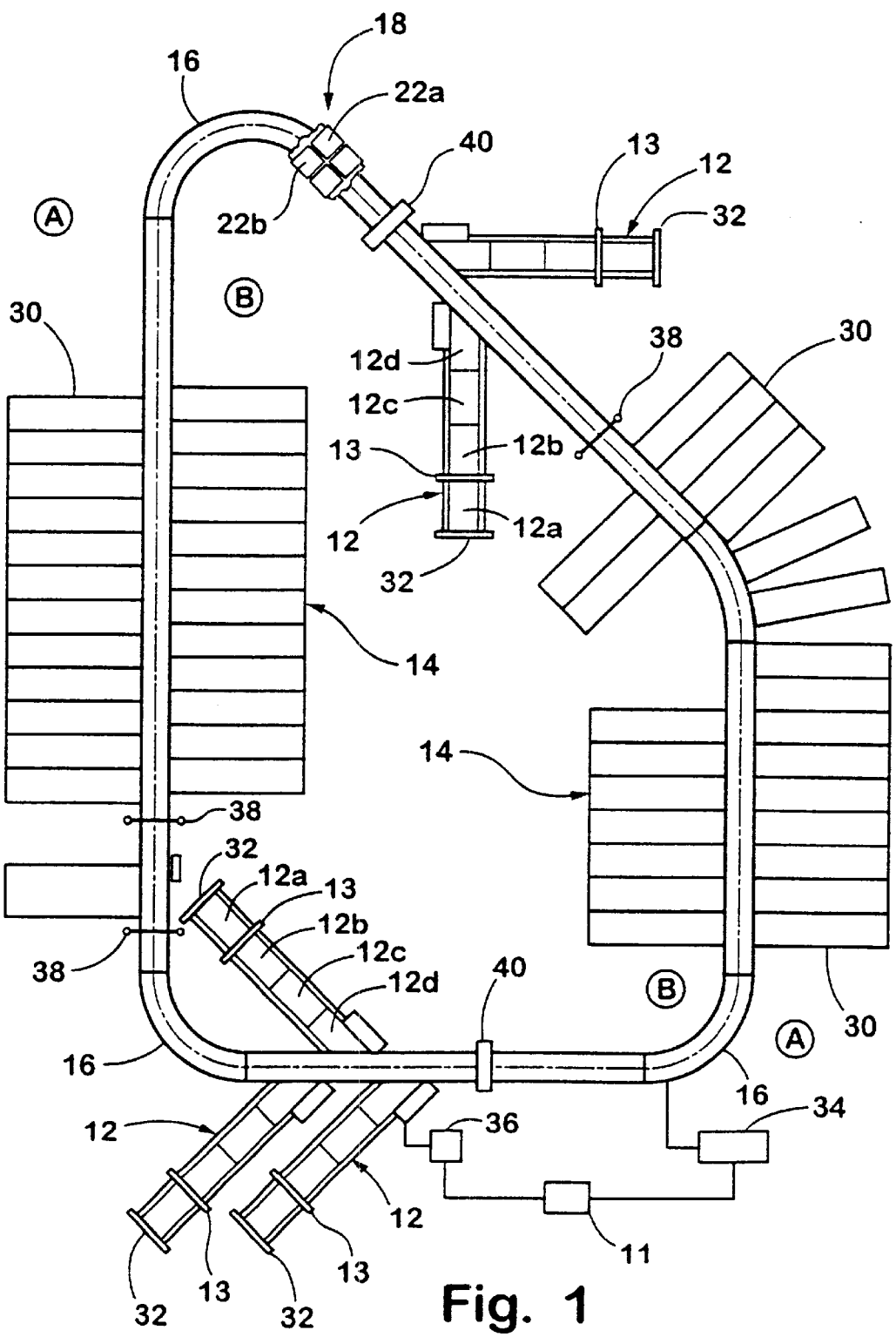
FIG. 1 is a plan view of the sortation system of the present invention.
Figure 3:
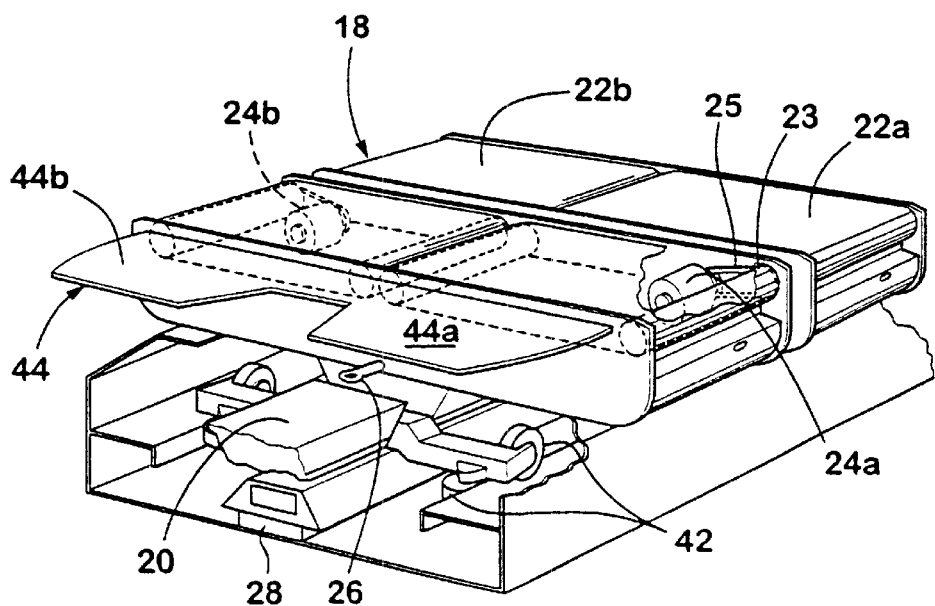
FIG. 3 is a perspective view of the dual carrier-belt transport units in accordance with the present invention, with a portion of the rails cut away.

Referring now specifically to the drawings and the illustrative embodiments depicted therein, a sortation system 10 includes one or more parcel induction stations 12 and one or more discharge stations 14 interconnected by a continuous conveying path 16 (FIG. 1). A plurality of transport units 18 move continuously along conveying or guide path 16 to transport parcels or packages between the induction stations 12 and discharge stations 14. Each transport unit 18 includes a frame 20 and a pair of carrier belts 22a and 22b, which are supported on frame 20 and driven by a pair of corresponding driving means 24a and 24b in a direction generally orthogonal to the motion of transport units 18 along conveying path 16 (FIG. 3). Preferably, each of the drive motors 24a and 24b of each transport unit 18 are operable independently or in conjunction with each other, using the principles disclosed in commonly assigned U.S. Pat. No. 5,588,520, the disclosure of which is hereby incorporated herein by reference. Because each drive motor 24a, 24b, and thus each carrier belt 22a, 22b, may be independently operated, transport units 18 are capable of simultaneously discharging a package from each belt to a corresponding side of conveyor path 16, and may further be operable to induct packages from either side, and/or transfer a package onto the other belt of the transport unit, as discussed in detail below. Preferably, transport units 18 are coupled by a coupling means 26, in order to move in unison as one or more trains along conveying path 16. Transport units 18 are propelled along conveying path 16 via a motorized drive system, such as a linear motor 28 of the type disclosed in U.S. Pat. No. 5,588,520.

Crossbelt sortation system 10 is controlled by a control system 11 which includes a supervision system, which is joined with induction control 36 and sortation control 34, preferably utilizing the principles disclosed in U.S. Pat. No. 5,588,520. Suffice it to say that the controls are network configured and operable to control the belts of each induction station 12, the linear motor 28 of the conveying path, and the drive motors or means 24a and 24b of each transport unit 18 in response to the location of the transport units, the status of the transport units (booked or not booked) and the parcels detected on the induction systems, as discussed in detail below.

As shown in FIG. 3, transport units 18 travel along conveyor path 16 via a rolling engagement of a set of vertical and horizontal guide wheels 42 with corresponding tracks or rails 16a of conveyor path 16. An insulated bus (not shown) positioned along conveying path 16 is operable to supply electrical power and data signals to transport units 18 through one or more pickup chute or brush assemblies (also not shown). Each carrier belt 22a, 22b of transport unit 18 is movable via actuation of corresponding motors 24a, 24b, which are coupled to a corresponding carrier belt drive pulley 23 by a cog belt 25. Drive motors 24a, 24b are operable to drive carrier belts 22a, 22b in either direction to load or unload packages or to transfer a package from one belt to the other of the transport unit. Drive motors 24a, 24b are actuated and deactuated in response to an electrical signal from control system 11.

Each transport unit 18 further includes a top shield or plate 44, which extends from one end of each transport unit 18, in order to provide support of a parcel and to prevent a package or parcel from falling between two adjacent transport units as the transport units and packages are conveyed along conveying path 16. Preferably, top shields 44 comprise a pair of longitudinally extending wings or plates 44a, which partially insert within an adjacent transport unit, thereby providing continuous support between the transport units, with no gaps therebetween. The support plates 44a engage the adjacent transport unit, such that the surface is maintained between adjacent transport units even when the transport units are curved around a corner of conveying path 16. This provides improved support and enhanced safety for both users of sortation system 10 and for products being transported therealong.

Figure 4:
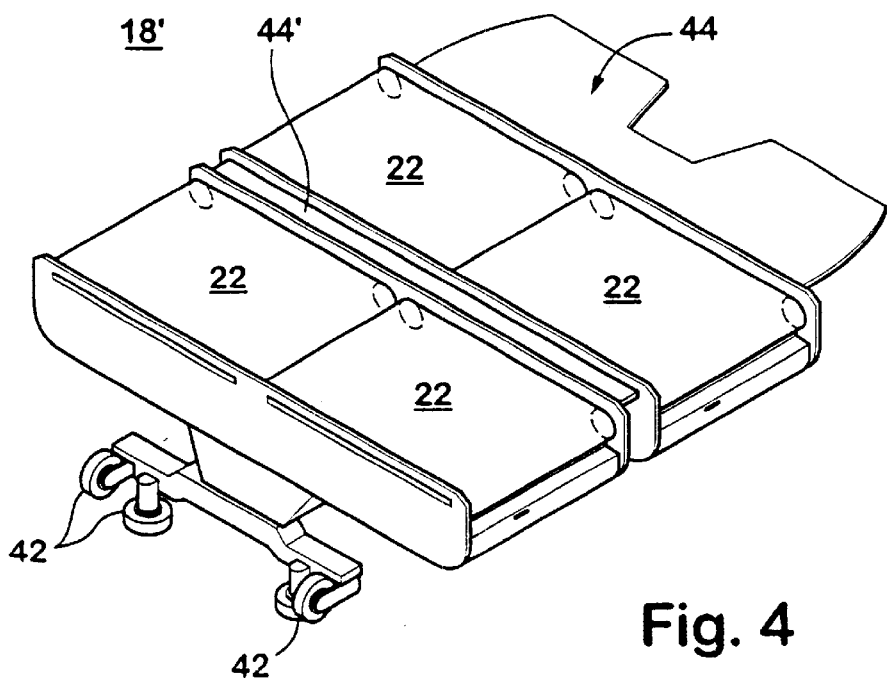
FIG. 4 is a perspective view of a quad belt transport unit of the present invention.

As shown in FIG. 4, a single transport unit 18' may comprise a pair of adjacent units which each have side-by-side carrier belts positioned thereon. The quad belt transport unit 18' thus comprises four cells or carrier belts 22, each of which may operate in either independent or synchronized modes. A top shield 44' is positioned between the pairs of side-by-side belts to provide support between the pairs of cells, while top shield 44 extends from one end of transport unit 18' to engage with the next adjacent transport unit (not shown in FIG. 4). The preferred embodiment thus provides a larger surface area to accommodate large and even oversized packages, which may be received and discharged by transport unit 18' via synchronous actuation of each of the cells or belts 22, using principles similar to those disclosed in U.S. Pat. No. 5,588,520.

Figure 2:
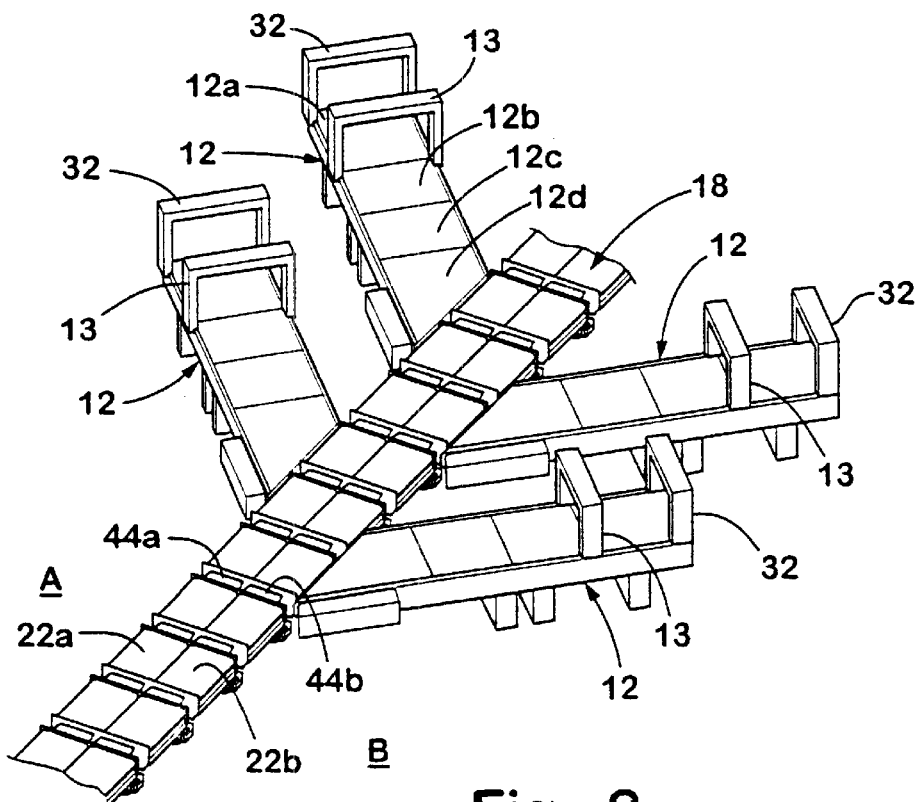
FIG. 2 is a perspective view a section of a crossbelt sortation system in accordance with the present invention.

As shown in FIGS. 1 and 2, sortation system 10 includes a plurality of induction stations 12 positioned along both sides of conveyor path 16. A loadability sensor 38, such as a photo sensor or the like, is positioned upstream of induction stations 12 along conveying path 16 and is operable to identify or confirm which transport units 18 are not loaded and, therefore, available to be selected or "booked" by the induction station for loading of a particular parcel. Each induction station 12 is under the control of induction control 36, and includes a series of individually controlled belts aligned at an angle with conveying path 16. The belts of the induction station include a coding belt 12a, a buffer belt 12b, a synchronization belt 12c, and a loading belt 12d, similar to the induction belts which are disclosed and described in detail in U.S. Pat. No. 5,588,520. A parcel 12d sensor 13 is positioned at coding belt 12a and is operable to determine the length, width and lateral position of each parcel on induction station 12.

Induction control 36 is operable to control the movement of the belts 12a–12d of the induction stations 12. A parcel or article identification system or scanner 32 is positioned at the induction stations and is operable to scan parcels and convey information to induction control 36 with respect to which side of conveying path 16, such as an outer side A or an inner side B, the parcels or packages are to be discharged from the transport units. Additionally, induction control 36 monitors parcel sensor 13 in order to determine the position of the parcel on the induction belt and to calculate the parcel dimensions. When a parcel is received at induction station 12 on the coding or start/stop belt 12a, induction control 36 awaits identification of the parcel by the identification system 32. The parcel is then transferred from the coding or start/stop belt 12a to the buffer belt 12b, while induction control 36 calculates the partial position from the lateral edge of the belt, as well as parcel length and parcel width in response to parcel sensor 13. If other parcels are on synchronization belt 12c and awaiting loading onto one or more transport units 18, buffer belt 12b will stop until the parcel on the synchronization belt 12c is loaded. When a parcel is transferred to synchronization belt 12c, induction control 36 selects and books one or more of the appropriate carrier belts 22a, 22b of an available transport unit 18, depending on the size of the parcel, the destination of the parcel and the status of the approaching transport units, as determined by loadability sensor 38. Based on the parcel length and position, induction control 36 performs calculations to establish the location of a loading synchronization point as the booked transport unit or units are approaching the induction station. When the booked cell or cells arrive at the synchronization point, induction control 36 activates the synchronization and loading belts 12c and 12d, respectively, and correspondingly activates the drive motors 24a and/or 24b for one or more of the carrier belts of one or more of the booked transport units for that parcel, in order to accelerate and move the parcel onto the appropriate cell or cells of the transport unit or units.

Sortation system 10 further includes a plurality of discharge stations 14 positioned along both sides of conveying path 16 (FIG. 1). Each discharge station 14 is made up of a plurality of receiving ports 30, which may be positioned along one side of conveying path 16, or along opposite sides of conveying path 16. Receiving ports 30 may include a divided chute (not shown) to control the discharge of the packages, depending on the particular details of the application. Preferably, an article identification scanner 32 is provided upstream of each discharge station 14 along conveying path 16, and more preferably, is provided at each of the induct stations 12, as shown in FIGS. 1, 2 and 5–8. Scanner 32 is operable to provide an input to sortation control 34 which conveys information scanned from each article or parcel to either identify the parcel or confirm the identification of the parcel, in order to insure that the parcels are discharged at the appropriate receiving port 30. Additionally, a re-centering station 40 may also be provided downstream of each induction station 12 along the conveying path 16. The re-centering station 40 is operable to verify, by use of photo sensors or other means, that each parcel is centered on each carrier belt or belts of the respective transport unit 18, and if the parcel is not centered, the carrier belt or belts are jogged or adjusted to re-center the parcel on the particular belt and/or transport unit.

Figure 5:
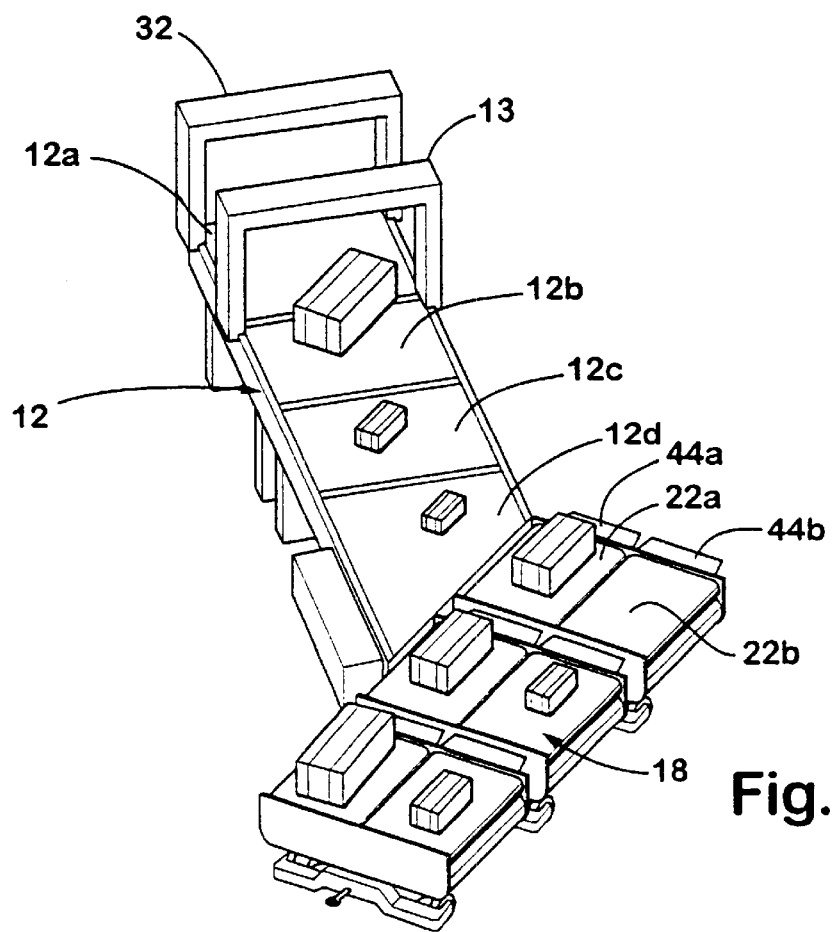
FIG. 5 is perspective view of an induction station inducting packages onto the transport units of FIG. 3.
Figure 6:
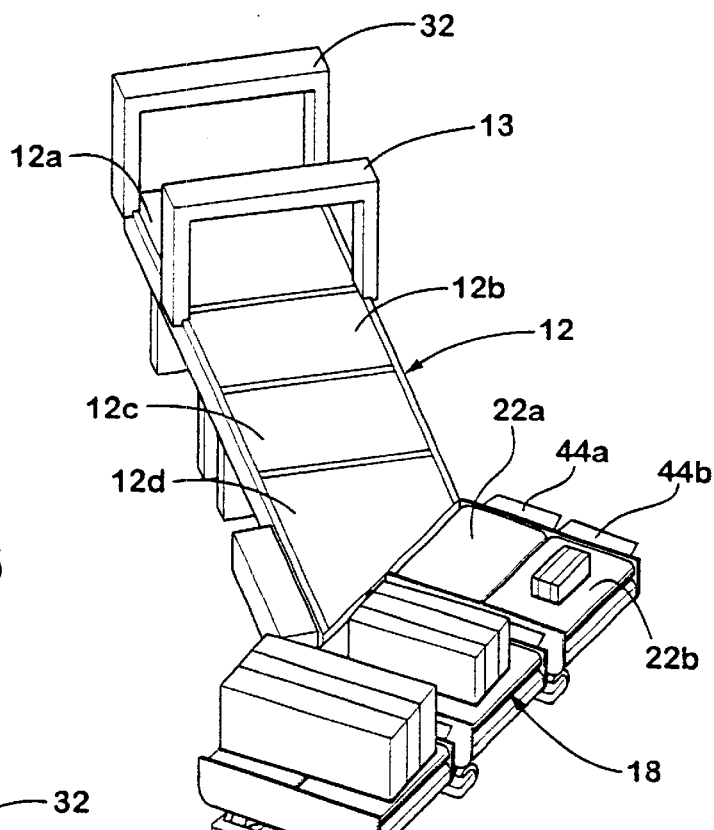
FIG. 6 is a perspective view similar to FIG. 5, with larger packages being inducted and positioned on both of the carrier belts of the transport units.
Figure 7:
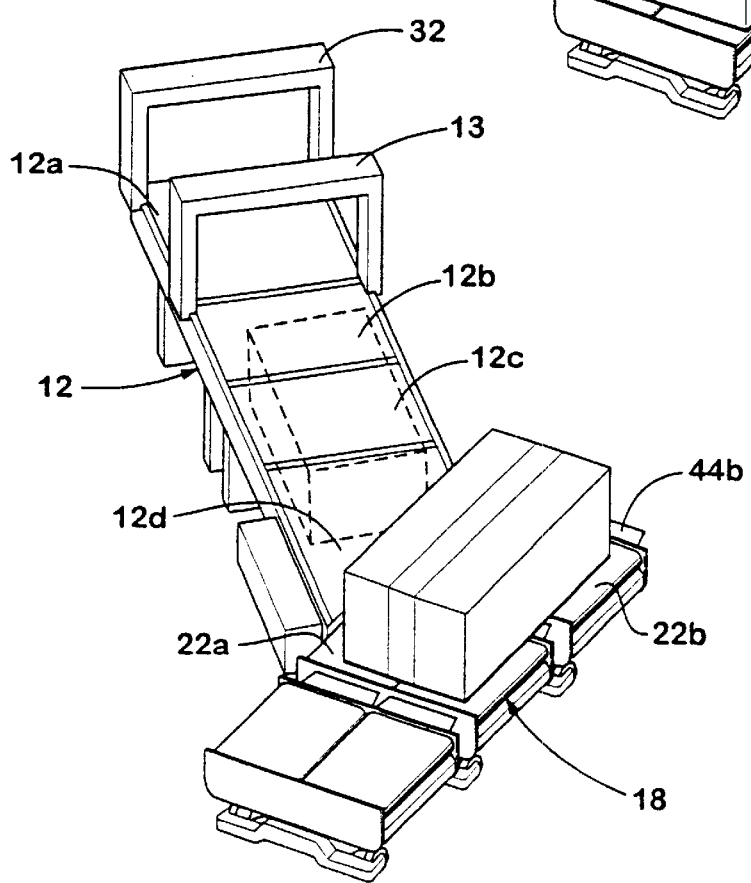
FIG. 7 is a perspective view similar to FIG. 5, with an oversized package being inducted and positioned onto the carrier belts of adjacent transport units.

As best shown in FIGS. 2 and 5, parcels or packages, such as boxes, envelopes, bags, and/or the like, are conveyed along induction station 12 toward transport units 18 moving along conveyor path 16. Parcel sensor 13 determines the size and orientation of the parcels as they pass by parcel sensor 13 at induction stations 12, while article scanner 32 determines the destination chute or port for the parcels. The availability sensor 38 and induction control 36 then determine which cell of which approaching transport unit is to be booked for each particular parcel on induction station 12. The destination of the package lets the induction control 36 know which side A or B of conveying path 16 the packages to be discharged to, so that induction control 36 may determine which transport unit is appropriate for the package, depending on the available or unbooked space on the transport unit, and on any package which may already be positioned on one of the two side-by-side cells of the unit. Articles destined for the opposite side of the conveyor path 16 from the induction station at which they are initially positioned may be loaded onto one side of the transport unit and transferred to the opposite carrier belt. This leaves the initial belt open or vacant for another article, which may be destined for a discharge station at either side of the conveyor path 16. For example, if an article is to be discharged on an opposite side of the conveying path from the induction station, induction control 36 searches for an empty transport unit or one which is carrying an article which is also to be discharged on the opposite side and which also has one of the two side-by-side cells available for the article at the induction station. If necessary, an article on the same side of the conveyor path as the induction station may be transferred to the other side of the transport unit to provide space for the article at the induction station. Once a cell of a transport unit is determined to be available and appropriate for the next article on the induction station, that cell is booked by the induction control and sortation controls in order to prevent other induction stations from similarly booking the same cell. When the booked cell of the transport unit arrives at the induction station, the article is then moved from the induction station to the booked cell and then transported along conveying path 16 to the targeted destination, where it is then discharged.

Because the articles may be inducted onto either side of the transport units 18, and then may be transferred from one side to the other, if necessary, the present invention provides improved system throughput without the need for presorting of the articles. As the articles are inducted onto the transport unit, the controls of the present invention effectively sort the items, which may have a destination to either side of the conveying path 16, by sequencing the articles to the correct side of the transport units, depending on the destination of one or both of the articles to be positioned on the transport unit, thereby achieving a similar throughput as a presorted single crossbelt system. It is further envisioned that the articles may be presorted at the multiple induction stations or areas, which results in substantially improved throughput over conventional systems. Because articles may be transferred from one side or belt to the other, and each transport unit may transport articles destined for either side of the conveyor path, the present invention does not have to accept and induct articles in a strict sequence. The articles thus may be scheduled and inducted from whichever induction station provides optimal sequencing of the articles, depending on the destination of the next articles on the induction station or stations.

In order to prevent cell gridlock, where an item present on a cell on one side of the transport unit is to be discharged on the other side, but an item is already present on the cell of other side which is to be discharged on the first side, each item is identified at the induction station prior to being inducted onto the next available transport unit. It is then possible for the control system of the present invention to predetermine the induction sequence to prevent such cell gridlock. By effectively presorting and sequencing articles prior to inducting the articles onto the booked cells, the present invention substantially reduces the likelihood of cell gridlock. More particularly, the sortation system has a total number of induct patterns which is defined as the sequence number to a power of the number of inducts of the sortation system. Therefore, for a single induction station, the total patterns would be $4^1$, and would have one unsuccessful sequence out of four possible sequences or patterns, such as when an article destined for the inner side B of the conveying path is positioned on a cell at the outer side A of the sorter or transport unit and an article destined for the outer side A is positioned on a cell at the inner side B of the same unit. This results in a 75% success rate for the system. Because of the high throughput capacity of the sortation system of the present invention, the sortation system may include four or more induction stations in an induct area, whereby the total patterns of the induct area would be $4^4$, or 256, possible sortation patterns. Because sortation system 10 is operable to effectively presort the packages as they are inducted onto the appropriate transport units, the total number of gridlocked units may be as low as 8 out of the 256 possible patterns, for a success rate of approximately 96.8%. The success rate is also dependent on the type of sortation application. For example, with an order processing application, whereby the items being sorted are batch picked and thus do not have a specifically allocated chute destination, high pre-sequencing rates may be achieved. Alternately, a dispatch operation, whereby each item has a predefined chute destination along the conveyor path, may result in reduced flexibility of the sortation system to manage the pre-sequencing process and would thus reduce the pre-sequencing rate. However, in both cases, the present invention provides improved success rates and throughput over the sortation systems of the prior art.

Figure 8:
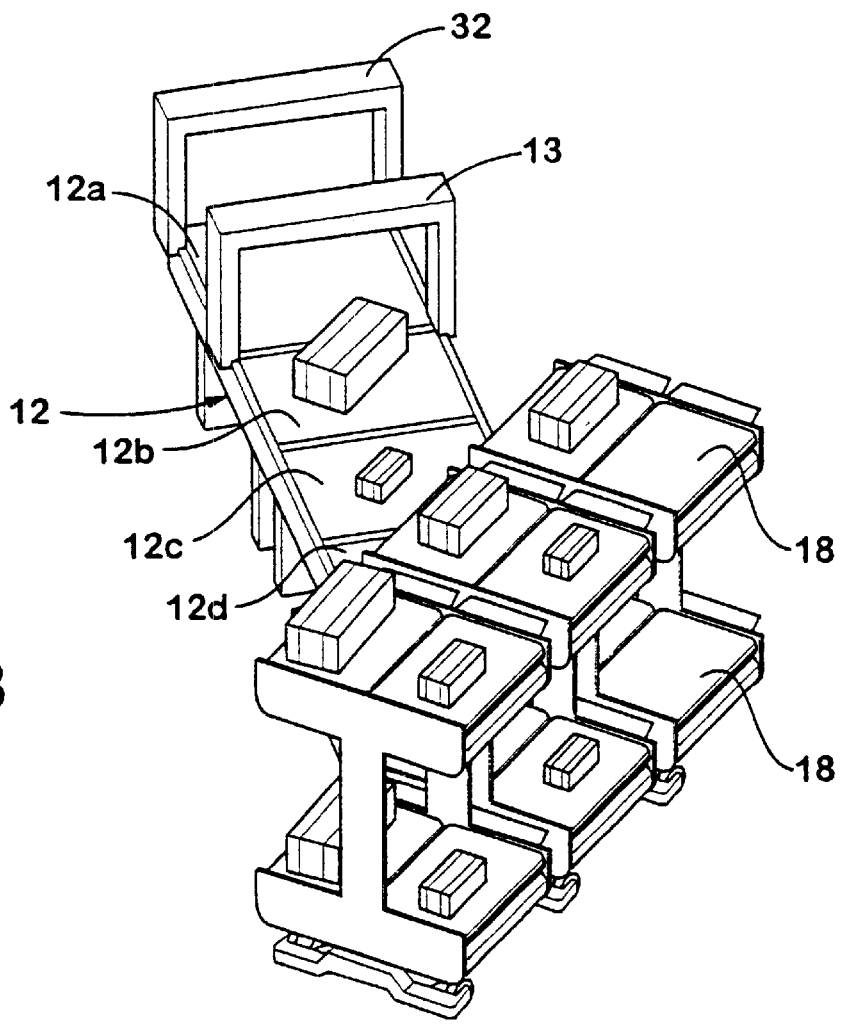
FIG. 8 is a perspective view of a two-level sortation system in accordance with the present invention.

If a larger package or parcel, which is too big for a single cell and thus requires both carrier belts of a single transport unit (FIG. 6), is being loaded onto the transport unit, both carrier belts 22a and 22b are operated together to load the larger package on both carrier belts of a single transport unit 18, in a manner utilizing the principles disclosed in U.S. Pat. No. 5,588,520. Alternately, if an oversized package or parcel, which requires the carrier belts of two adjacent transport units (FIG. 7), is being loaded onto the transport units, the belts of a leading transport unit are operated together, while the belt of the trailing transport unit are operated together, utilizing the principles disclosed in U.S. Pat. No. 5,588,520, such that the oversized package is pivoted and/or rotated as it is moved onto the adjacent transports units, in order to position the package generally centrally on the four carrier belts of the adjacent transport units. The articles may be discharged in a similar manner. Optionally, the transport units may be arranged in a double layer or decked manner, as shown in FIG. 8, whereby the throughput may be further enhanced. Such a system may be implemented with two levels of induction and discharge stations. With a double decked sorter, very high sortation rates may be achieved, which are suitable for cross-docking and inter-linking sortation systems.

Figure 9A:
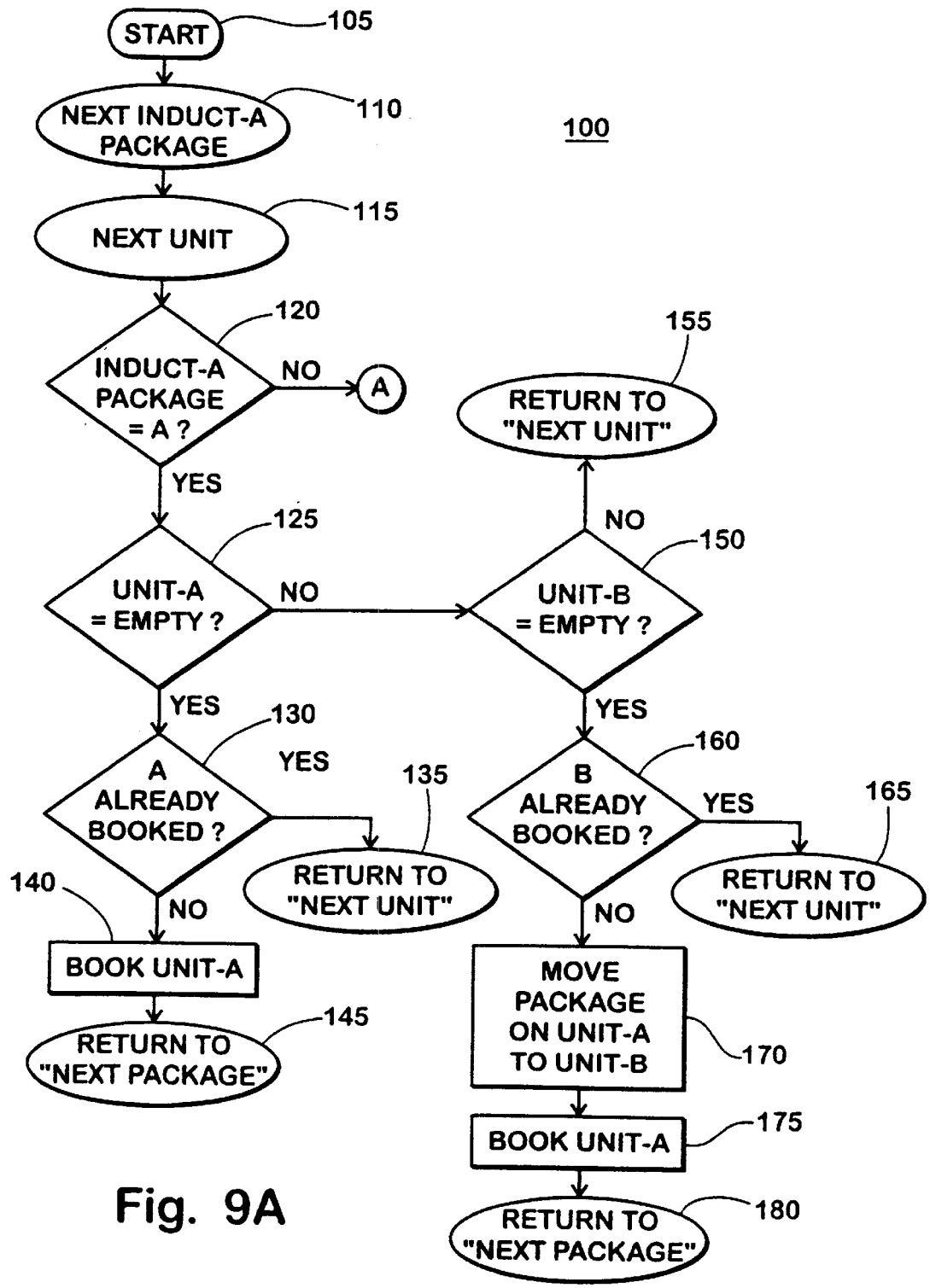
FIGS. 9A and 9B are a flowchart of the control processes of an induction station in accordance with the present invention.
Figure 9B:
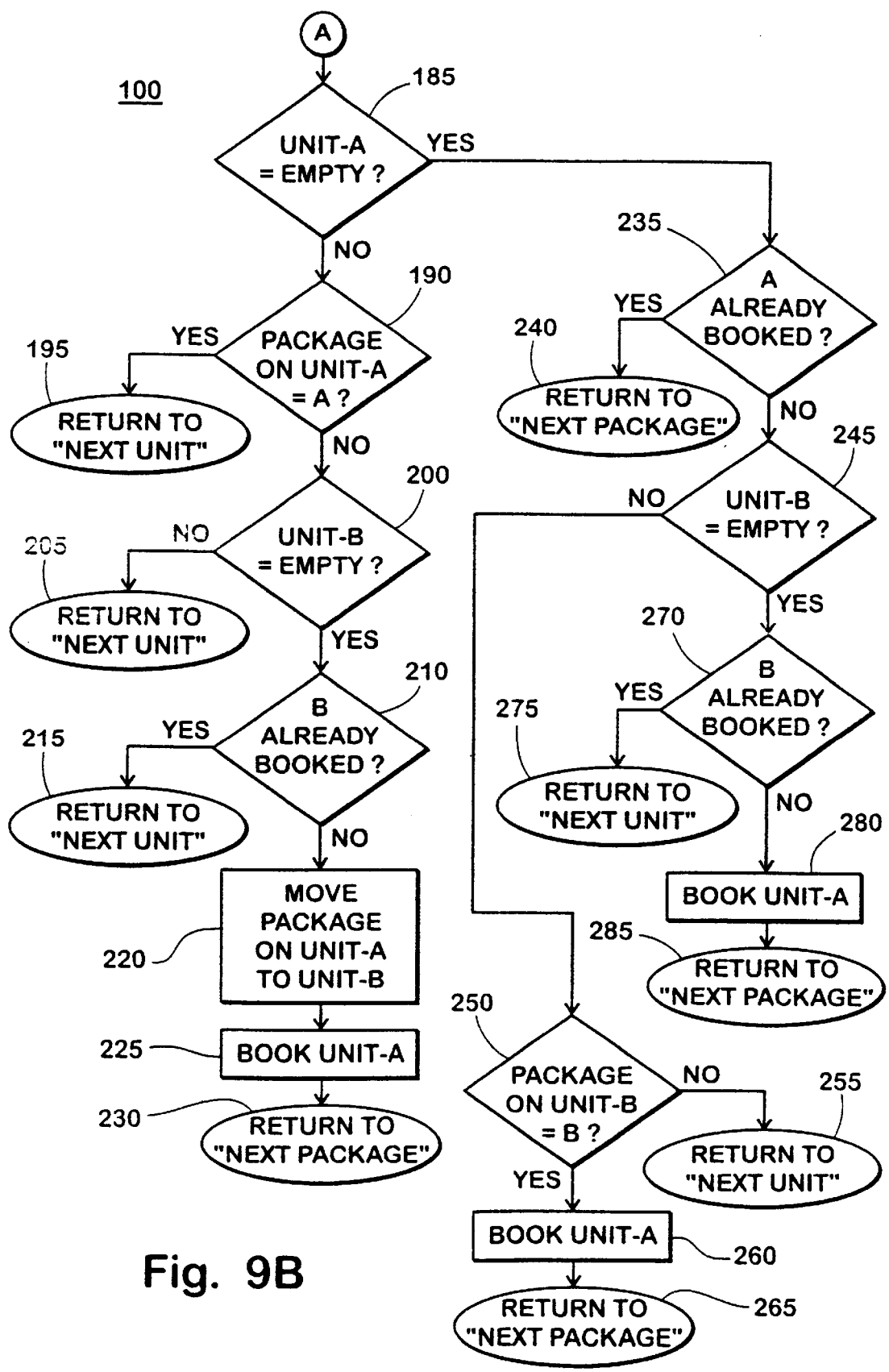

Referring now to FIGS. 9A and 9B, an induction process 100 is shown which illustrates the decision making process for a single induction station. Process 100 illustrates the control decisions of an induction station positioned at the outer side A of the conveyor path 16. The processes for other induction stations on the inner side B of the conveyor path are substantially the same, such that a detailed discussion of such induction station controls will not be included herein. The packages being inducted by the induction station at outer side A are scanned by parcel scanner or identification system 32 to determine whether the package is to be discharged on outer side A or inner side B of the conveyor path 16. The packages are inducted onto an appropriate transport unit, and may be carried by an outer carrier belt of the transport unit along the outer side A of conveyor path 16, or an inner carrier belt of the transport unit along the inner side B of conveyor path 16. The process 100 is similarly and simultaneously operable for the other induction stations at either side of the conveying path. Process 100 illustrates the decision processes for booking cells or belts of transport units for parcels or packages which are small enough to be carried by a single cell. If the package is larger, and thus requires two or more cells, then the process searches for two or more adjacent available cells which may receive the parcel thereon.

Process 100 starts at 105 and the induction station (induct-A) on the outer side A of the conveyor path receives the next package and scans the package at 110 to determine the destination of the package. The status of the next approaching transport unit is then reviewed at 115 to determine whether there is an available carrier belt or cell on that particular transport unit, and to determine the destination of any other package which may already be on the transport unit. It is then determined at 120 whether the package on the outer induction station is to be discharged on the outer side A of the conveyor path. If it is determined at 120 that the package is to be discharged on the outer side A of the conveyor path, it is then determined at 125 whether the cell or carrier belt on the outer side A of the next transport unit is empty. If it is determined that the transport unit is empty on the outer side A, it is then further determined if the carrier belt on that side is already booked by another induction station along the conveyor path at 130. If it is determined at 130 that the outer side A of the unit is already booked, process 100 returns at 135 to determine the status of the next transport unit at 115. On the other hand, if it is determined at 130 that the cell on the outer side A of the transport unit is available, process 100 proceeds to book the outer side carrier belt at 140 and then returns at 145 to scan the next package on the induction station 110. The parcel will then be moved or loaded onto the booked belt or belts when the booked unit arrives at the induction station.

If it is determined at 125 that the carrier belt on the outer side A of the transport unit is not empty, then it is further determined at 150 whether the carrier belt on the inner side B of the conveyor path is empty. If the carrier belt on inner side B is not empty, then process 100 returns at 155 to determine the status of the next approaching transport unit at 115. On the other hand, if the belt on the inner side B of the transport unit is empty, the process 100 then determines at 160 whether the carrier belt at the inner side B has already been booked by another induction station. If it is determined at 160 that the cell at the inner side B has already been booked, the process 100 returns at 165 to determine the status of the next approaching transport unit at 115. If it is otherwise determined at 160 that the cell at the inner side B of the transport unit is not already booked, then process 100 may move the package positioned on carrier belt at the outer side A across the transport unit to position the package on the carrier belt at the inner side B of the transport unit at 170. Process 100 then proceeds to book the carrier belt on side A of the transport unit at 175 and returns at 180 to scan the next package on the induction station at 110. The package will then be moved onto the booked carrier belt when the transport unit arrives at the induction station. Both packages may later be discharged at the outer side A when the transport unit arrives at their appropriate destinations, or may be discharged to opposite sides of the conveying path, depending on the destination of the package that was moved to the carrier belt on the inner side B of the transport unit. If both of the packages are designated to particular chutes or destinations along the outer side A of the conveyor path, the process 100 may further consider which package is to be discharged first when determining whether a cell is available and appropriate or compatible with a particular package at the induction station.

If it is determined at 120 that the package being inducted at the induction station is not targeted to be discharged on the outer side A of the conveyor path, then process 100 further determines at 185 whether the cell at the outer side A of the unit is empty (FIG. 9B). If the carrier belt on the outer side A is not empty, it is then determined at 190 whether the package on the carrier belt at the outer side A is to be discharged at the outer side A of the conveyor path. If the package is to be discharged on the outer side A, then the article at the induction station cannot be loaded onto that transport unit, since this would result in cell gridlock. The process 100 thus returns at 195 to determine the status of the next approaching unit at 115. On the other hand, if it is determined at 190 that the package on the carrier belt at the outer side A of the unit is not to be discharged along the outer side A of the conveyor path, then it is further determined at 200 whether the carrier belt on the inner side B of the transport unit is available. If it is determined at 200 that the carrier belt on the inner side B is not empty, then process 100 returns at 205 to determine the status of the next approaching transport unit at 115. On the other hand, if it is determined at 200 that the carrier belt on the inner side B is empty, then it is further determined at 210 whether that cell or carrier belt has already been booked by another induction station. If the carrier belt on the inner side B has already been booked, then process 100 returns at 215 to determine the status of the next approaching transport unit at 115. If the carrier belt on the inner side B has not already been booked, then process 100 transfers the package on the outer side A of the transport unit to the carrier belt on the inner side B of the transport unit at 220. Process 100 then books the carrier belt on the outer side A of the transport unit at 225 and returns at 230 to scan the next package at 110. The package will then be moved onto the booked carrier belt when the transport unit arrives at the induction station. Both packages will be later discharged at the inner side B of the conveyor path when the transport unit arrives at their appropriate destinations. If the packages are designated to be discharged at particular chutes or destination ports along the conveyor path, process 100 may further consider which package is to be discharged first when determining whether the cell is available and appropriate or compatible for the particular package at the induction station.

If the package at the induction station is to be discharged on the inner side B and it is determined at 185 that the carrier belt on the outer side A of the transport unit is empty, then it is further determined at 235 whether the belt on the outer side A has already been booked by another induction station. If the carrier belt on the outer side A of the transport unit has already been booked, process 100 returns at 240 to determine the status of the next approaching transport unit at 115. On the other hand, if the carrier belt on the outer side A has not already been booked, it is then determined at 245 whether the carrier belt on the inner side B of the transport unit is empty. If it is determined at 245 that the carrier belt on the inner side B of the transport unit is not empty, then it is further determined at 250 whether the package on the carrier belt at the inner side B is to be discharged at the inner side B of the conveyor path. If the package that is already positioned on the carrier belt on the inner side B is not to be discharged on the inner side B of the conveyor path, then process 100 returns at 255 to determine the status of the next approaching transport unit at 115, since loading the package at the induction station onto the carrier belt at the outer side A of that transport unit would result in cell gridlock for that unit. If, on the other hand, the package that is already positioned on the carrier belt on the inner side B is to be discharged on the inner side B of the conveyor path, then process 100 proceeds to book the carrier belt at the outer side A of the transport unit at 260 and return at 265 to scan the next package at the induction station at 110. The package is then moved onto the booked carrier belt when the transport unit arrives at the induction station. The packages on each carrier belt of that particular transport unit will later be discharged at opposite sides of the conveyor path at their appropriate destinations. If the packages are designated to be discharged at particular destination ports along the conveyor path, process 100 may consider which package is to be discharged first when determining whether the cell is compatible for the particular package at the induction station.

If it is determined at 245 that the carrier belt on the inner side B of the transport unit is empty, then it is further determined at 270 whether the empty carrier belt on that side has already been booked by another induction station. If the carrier belt on the inner side B of the conveyor path has already been booked, then process 100 returns at 275 to determine the status of the next approaching transport unit at 115. On the other hand, if it is determined at 270 that the carrier belt on the inner side B has not already been booked, then process 100 proceeds to book the carrier belt on the outer side A of the transport unit at 280 and return at 285 to scan the next package at the induction station at 110. The package is then moved onto the booked carrier belt when the transport unit arrives at the induction station. The package may be transferred to the other side of the transport unit, if necessary to make room for another package, or may wait until the transport unit arrives at the destination or port for the package, whereby the package will be transferred across the transport unit and discharged.

Although shown and described as being a single process for a single induction station on one side of the conveyor path, the process is simultaneously and continuously performed for each induction station along the conveyor path of the sortation system. The status of each transport unit is reviewed to determine if the transport unit is capable of receiving a package from the next induction station, while the induction station simultaneously determines the destination of the next package, in order to determine whether the package may be inducted onto the approaching transport unit. The present invention thus provides improved throughput by having the ability to place two packages on each transport unit, whereby both packages may be discharged to the same side of the conveyor path or each package may be discharged to opposite sides of the conveyor path, without requiring any pre-sortation of the packages prior to placing the packages on the induction stations. Although not included in the flow chart of FIGS. 9A and 9B, if the package at the induction station is too large to be placed on a single belt or cell of the transport unit, the process is further operable to book two or four adjacent cells for that package. The oversized package may then be loaded onto the adjacent cells using the principles disclosed in U.S. Pat. No. 5,588,520. Although shown and described as a process for each induction station which determines whether the particular carrier belts of the approaching transport unit are already booked by any other induction station, it is further envisioned that the controls of the present invention may further analyze and compare the size and destination of the packages on the induction stations and the destination of the packages on cells moving along the conveyor path to further optimize which of two or more packages at two or more induction stations will be placed on an available cell or carrier belt of a transport unit, thereby further optimizing the sortation system of the present invention.

Therefore, the present invention provides a sortation system which provides improved throughput, without requiring pre-sequencing of the items to the correct side of the sorter or conveyor path. The items may be inducted onto a cell or carrier belt of a transport unit and transferred over to the other side of the transport unit if necessary. This allows an induction station to then induct an item onto the now vacant cell on the initial side of the transport unit.

Because the present invention is operable to effectively presort the packages as the packages are inducted onto the transport unit, the present invention provides substantially improved throughput rates, with greatly reduced manual intervention required. The present invention provides for effective presortation of the packages, and allows for two packages to be carried by a single transport unit, thereby substantially increasing the number of items per hour that can be transported from a given induction station or stations to the appropriate chute destination. The sortation system effectively pre-sequences the items to the correct side of the transport unit, and thus is capable of achieving substantially the same throughput as a presorted single crossbelt system. It is further envisioned that if the packages are presorted at the induction stations, then the sortation system may provide four times the benefit over the presorted single crossbelt systems of the prior art.

Additionally, because the sortation system of the present invention is capable of providing significantly improved throughput, the sortation system may accommodate induction stations which are operable at a higher induction rate than existing induction stations. For example, an existing induction station may have a throughput limit of approximately 3300 items per hour, while a high rate induction system may be operable with the present invention to induct approximately 6000 items per hour, thereby further enhancing the throughput of the present invention. Optionally, the induction stations or systems used with the present invention may be of the type disclosed in commonly assigned, co-pending U.S. Pat. Application entitled HIGH RATE INDUCTION SYSTEM, filed Sep. 25, 2000 by Affaticati et al. Ser. No. 09/669,170), which is hereby incorporated herein by reference.

Accordingly, the present invention is operable to provide improved throughput capacities over the prior art, without complex presortation of the packages. The present invention is also operable to handle a large range of sizes and weights of the products by utilizing two or more carrier belts which are operable in either a synchronized or concurrent manner. The sortation system is thus able to orient large products onto both cells of one transport unit or onto the cells of two adjacent transport units to accommodate oversized products. The present invention thus provides improved throughput capabilities, while providing optimal versatility and accommodating various packages, preferably using the principles disclosed in commonly assigned U.S. Pat. No. 5,588,520.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. A method of sorting articles, comprising:
   a plurality of transport units coupled together and moving in a conveying path between at least one induction station and at least one discharge station, each transport unit having side by side driven carrier belts, said crossbelt sortation system being operable to load articles onto said plurality of transport units as said plurality of transport units continuously move past said at least one induction station.

2. The crossbelt sortation system of claim 1, wherein said carrier belts are movable in a direction which is orthogonal to the conveying path.

3. The crossbelt sortation system of claim 1, wherein each of said carrier belts is at least occasionally independently driven from the other of said driven carrier belts.

4. The crossbelt sortation system of claim 1, wherein said plurality of said transport units comprise an endless chain of transport units moving along an endless conveying path.

5. The crossbelt sortation system of claim 4, wherein at least one of said at least one induction station and at least one of said at least one discharge station are on opposite sides of the endless conveying path.

6. The crossbelt sortation system of claim 4, wherein at least one of said induction stations and at least one of said discharge stations is positioned on each side of the endless conveying path.

7. The crossbelt sortation system of claim 1, wherein said transport units include a pair of electric motors, each of said electric motors being operable to drive one of said driven carrier belts.

8. The crossbelt sortation system of claim 1, wherein each of said transport units comprise first and second pairs of side-by-side carrier belts.

9. The crossbelt sortation system of claim 1, wherein said carrier belts are synchronously operable with carrier belts of an adjacent transport unit to load an article onto said carrier belts of an adjacent pair of transport units.

10. The crossbelt sortation system of claim 1, wherein both of said carrier belts of said transport units are operable to receive a single article onto both of said carrier belts.

11. The crossbelt sortation system of claim 1 further including a support extending between adjacent transport units, said support including a pair of support plates, each of said pair of support plates extending between corresponding carrier belts of said adjacent transport units.

12. The crossbelt sortation system of claim 1, wherein said transport units comprise a plurality of upper transport units and lower transport units movable together along the conveying path.

13. The crossbelt sortation system of claim 1 further including a control which is operable to determine a destination of an article at said induction station and an availability status of each of said carrier belts of said transport units.

14. The crossbelt sortation system of claim 13, wherein said induction station comprises first and second induction stations, said control being operable to determine the destination of packages at both of said first and second induction stations.

15. The crossbelt sortation system of claim 14, wherein said control is operable to compare the destination of an article at said first induction station to the status of each transport unit approaching said first induction station to determine an appropriate carrier belt for transporting the article from said first induction station to an appropriate destination station.

16. The crossbelt sortation system of claim 15, wherein said control is further operable to select the appropriate carrier belt and to move the article from said first induction station onto the selected carrier belt when the selected carrier belt arrives at said first induction station.

17. The crossbelt sortation system of claim 16, wherein said control is operable to determine whether an appropriate carrier belt has already been selected by said second induction station before said control selects the appropriate carrier belt for the article at said first induction station.

18. The crossbelt sortation system of claim 13, wherein said control is operable to at least one of induct an article onto said carrier belts of said transport units, discharge an article from said carrier belts of said transport units, and transfer an article from one of said carrier belts of said transport units onto the other of said carrier belts of said transport units.

19. The crossbelt sortation system of claim 18, wherein said control is operable to at least one of induct, discharge and transfer the article in response to the availability status of the carrier belts and the destination of the article.

20. The crossbelt sortation system of claim 1, wherein said sortation system is operable to at least one of induct an article onto at least one of said carrier belts, transfer an article from one of said carrier belts of said transport units to the other of said carrier belts of said transport unit, and discharge an article from at least one of said carrier belts.

21. A method of sot articles, comprising:
providing a crossbelt sortation system which comprises a plurality of transport units coupled together and movable along a conveying path, at least one induction station, and at least one destination station, each of said transport units including at least two side-by side carrier belts;
continuously moving said plurality of transport units along said conveying path;
operating said at least one induction station to position articles on at least one of said side-by-side carrier belts of each of said transport units as said each of said transport units is continuously moved past said at least one induction station; and
operating said side-by-side carrier belts in order to discharge articles at desired destination stations.

22. The method of claim 21, wherein said carrier belts of each of said transport units are at least occasionally operable independently of one another.

23. The method of claim 21 including operating said carrier belts in order to at least one of load articles onto at least one of said carrier belts, discharge articles from at least one of said carrier belts and transfer an article from one of said side-by-side carrier belts to the other of said side-by-side carrier belts of a transport unit.

24. The method of claim 23 including providing at least one of said induction stations and at least one of said destination stations on opposite sides of said conveying path.

25. The method of claim 24 including operating said carrier belts in order to load articles from one of said induction stations and to discharge articles to one of said destination stations on an opposite side of said conveying path by operating said belts to transport the article across said side-by-side carrier belts toward said destination station.

26. The method of claim 21, where-in prior to operating said induction station, said method further includes the steps of:
determining an availability status of each of said carrier belts on said transport units;
determining a destination of an article at said induction station;
comparing the availability status with the destination to determine compatibility of the article with said carrier belts of said transport units; and
selecting a compatible carrier belt for receiving the article.

27. The method of claim 26, wherein said transport units comprise first and second carrier belts, said method including transferring an article from said first carrier belt to said second carrier belt to provide compatibility between said first carrier belt and the article at said induction station.

28. The method of claim 26, wherein said crossbelt sortation system includes a plurality of induction stations, the destination of each article on each of said induction stations being continuously compared to the availability status of each of said carrier belts of said transport units.

29. The method of claim 28, wherein prior to selecting a compatible one of said carrier belts for an article, said method further includes determining whether the compatible carrier belt has already been selected by one of said induction stations.

30. The method of claim 21, wherein said step of operating said induction station includes correspondingly operating at least one of said carrier belts at one of said transport units which is adjacent to said induction station to position an article on at least one of said carrier belts of said transport unit adjacent to said induction station.

31. The method of claim 30 including determining at least one of a size and shape of an article at said induction stations prior to operating said induction station and said at least one of said carrier belts.

32. The method of claim 31, wherein said carrier belts are operable at least one of independently, synchronously, and simultaneously, in response to at least one of the size and the shape of the article.

33. The method of claim 30, wherein the step of operating at least one of said carrier belts includes simultaneously operating both of said carrier belts of said transport unit to load an article onto both of said side-by-side carrier belts of said transport unit.

34. The method of claim 30, wherein the step of operating at least one of said carrier belts includes synchronously operating said side-by-side carrier belts of a pair of adjacent transport units, such that the article is rotated and moved onto said carrier belts of both of said adjacent transport units.

35. The method of claim 21 including determining a size and shape of an article at said induction stations prior to operating said induction station.

36. A crossbelt sortation system comprising:
an endless conveying path having a first side and a second side, said first side of said endless conveying path being generally opposite said second side;
a first induction station at said first side of said endless conveying path;
a second induction station at said second side of said endless conveying path;
a first destination station at said first side of said endless conveying path;
a second destination station at sad second side of said endless conveying path;
a plurality of transport units which are coupled together and movable along said conveying path, each of said transport units having first and second driven carrier belts which are movable in a direction generally transverse to a direction of said conveying path, said first carrier belt being at said first side of said endless conveyor path, said second carrier belt being at said second side of said endless conveyor path; and
a control which is operable to move articles from said first and second induction stations onto said transport units as said transport units are continuously moved along said conveying path and to discharge articles from said transport units to said first and second destination stations as said transport units are continuously moved along said conveying path.

37. The crossbelt sortation system of claim 36, wherein said control is operable to determine a size of articles at said first and second induction stations.

38. The crossbelt sortation system of claim 37, wherein said control is operable to move said carrier belts at least one of synchronously, simultaneously and independently in response to the size of the article.

39. The crossbelt sortation system of claim 38, wherein said control is operable to synchronously move said carrier belts of an adjacent pair of said transport units to pivot an article onto said carrier belts of said adjacent pair of transport units.

40. The crossbelt sortation system of claim 38, wherein said control is operable to simultaneously move said carrier belts of one of said transport units to move an article onto both of said carrier belts of said transport unit.

41. The crossbelt sortation system of claim 36, wherein said control is further operable to determine an availability status of each of said first and second carrier belts of said transport units and a destination of articles at said first and second induction stations.

42. The crossbelt sortation system of claim 41, wherein said control is operable to compare the availability status with the destination of articles to determine an appropriate one or more of said first and second carrier belts of said transport units for each article at said first and second induction station.

43. The crossbelt sortation system of claim 42, wherein said control is operable move an article from said first induction station onto said first carrier belt in response to the availability status and destination of the article.

44. The crossbelt sortation-system of claim 43, wherein said control is operable to move an article from said second induction station onto said second carrier belt of said transport units in response to the availability status and destination of the article.

45. The crossbelt sortation system of claim 43, wherein said control is operable to move the article from said first carrier belt to said second carrier belt in response to the availability status of said second carrier belt and the destination of another article at another of said first and second induction stations.

46. The crossbelt sortation system of claim 43, wherein said control is operable to move the article from said first carrier belt to said second carrier belt and to discharge the article from said second carrier belt to said second destination station.

47. The crossbelt sortation system of claim 43, wherein said control is operable to discharge an article from said first carrier belt to said first destination station.

48. The crossbelt sortation system of claim 36, wherein said control is operable to move articles from said first induction station onto said first carrier belt, said control being further operable to move the articles from said first carrier belt to said second carrier belt and to discharge the articles from said second carrier belt to said second destination station.

49. The crossbelt sortation system of claim 36, wherein said control is operable to move a first article from said first induction station onto said first carrier belt and to move a second article from said second induction station onto said second carrier belt.

50. The crossbelt sortation system of claim 49, wherein said control is operable to discharge the first article at one of said first and second destination stations.

51. The crossbelt sortation system of claim 49, wherein said control is operable to discharge the first and second articles at said first destination station.

52. The crossbelt sortation system of claim 49, wherein said control is operable to discharge the first article at said first destination station and the second article at said second destination station.

53. A crossbelt sortation system comprising:
a plurality of carriages which are continuously movable along an endless conveying path, said plurality of carriages passing at least one induction station and at least one discharge station, said at least one induction station being at an acute angle relative to said conveying path and being operable to induct articles onto said plurality of carriages in a direction having a component in the direction of travel of said plurality of carriages, each of said plurality of carriages having at least two side by side carrier belts, said carrier belts being movable to receive articles at said at least one induction station and to discharge articles at said at least one discharge station while said plurality of carriages maintain continuous movement along said conveying path.

54. The crossbelt sortation system of claim 53, wherein each of said at least two side by side carrier belts is at least Occasionally independently driven from the other of said driven carrier belts.

55. The crossbelt sortation system of claim 53, wherein said plurality of carriages comprise an endless chain of carriages continuously movable along said endless conveying path.

56. The crossbelt sortation system of claim 53, wherein said at least one induction station comprises at least two induction stations and said at least one discharge station comprises at least two discharge stations.

57. The crossbelt sortation system of claim 56, wherein at least one of said at least two induction stations and at least one of said at least two discharge stations are on opposite sides of the endless conveying path.

58. The crossbelt sortation system of claim 57, wherein at least one of said at least two induction stations and at least one of said at least two discharge stations are positioned on each side of said endless conveying path.

59. The crossbelt sortation system of claim 53 including a control which is operable to determine a destination of an article at said at least one induction station and an availability status of each of said carrier belts of said plurality of carriages.

60. The crossbelt sortation system of claim 59, wherein said control is operable to reduce gridlock as a result of articles loaded on said plurality of carriages.

61. The crossbelt sortation system of claim 60, wherein said control is operable to determine an induction sequence of articles and to induct articles onto sad plurality of carriages in said induction sequence to reduce gridlock on said plurality of carriages.

62. A method of sorting articles with a crossbelt sorter, comprising:
   providing a crossbelt sortation system which comprises a plurality of carriages continuously movable along an endless conveying path, at least one induction station at said endless conveying path, and at least one destination station at said endless conveying path, each of said plurality of carriages including side-by-side carrier belts;
   operating said at least one induction station to move articles toward said plurality of carriages in a direction having a component in the direction of travel of said plurality of carriages to position articles on at least one of said side-by-side carrier belts of each of said plurality of carriages as said each of said plurality of carriages is continuously moved along said conveying path; and
   operating said side-by-side carrier belts in order to discharge articles at desired destination stations as said each of said plurality of carriages is continuously moved along said endless conveying path.

63. The method of claim 62, wherein said carrier belts of each of said plurality of carriages are at least occasionally operable independently of one another.

64. The method of claim 62 including providing at least one of said at least one induction station and at least one of said at least one destination station on each side of said conveying path.

65. The method of claim 62 including:
   determining an availability status of each of said carrier belts on said plurality of carriages;
   determining a destination of an article at said at least one induction station;
   comparing the availability status with the destination to determine compatibility of the article with said carrier belts of said plurality of carriages; and
   selecting at least one compatible carrier belt for receiving the article.

66. The method of claim 62, wherein operating said at least one induction station includes reducing cell gridlock as a result of articles loaded onto said plurality of carriages.

67. The method of claim 62, wherein said operating said induction station includes correspondingly operating at least one of said carrier belts at one of said plurality of carriages which is adjacent to said at least one induction station to position an article on at least one of said carrier belts of said one of said plurality of carriages adjacent to said induction station.

68. A crossbelt sortation system comprising:
   a plurality of carriages which are movable along a conveying path passing at least one induction station and a plurality of discharge stations, each of said plurality of carriages being adapted to carry side-by-side articles, said at least one induction station being operable to induct articles to said plurality of carriages in a same order in which the articles are received at said at least one induction station, said plurality of carriages being operable to receive articles from said at least one induction station and to discharge articles at said plurality of discharge stations, wherein articles are loaded onto said plurality of carriages in a manner that reduces gridlock of articles on said plurality of carriages.

69. The crossbelt sortation system of claim 68, wherein each of said plurality of carriages comprises at least two side by side carrier surfaces.

70. The crossbelt sortation system of claim 69, wherein said at least two side by side carrier surfaces comprises at least two side by side carrier belts.

71. The crossbelt sortation system of claim 69, wherein each of said at least two side by side carrier surfaces is at least occasionally independently driven from the other of said at least two side by side carrier surfaces.

72. The crossbelt sortation system of claim 68 including a control which is operable to determine a destination of an article at said induction station and an availability status of said plurality of carriages, said control being operable to load the articles onto said plurality of carriages in response to said destination and said availability status.

73. The crossbelt sortation system of claim 72, wherein said control is operable to determine an induction sequence of articles and to induct articles onto said plurality of carriages in said induction sequence to limit gridlock of articles on said plurality of carriages.

74. The crossbelt sortation system of claim 68, wherein said plurality of carriages are continuously movable along sad conveying path.

75. The crossbelt sortation system of claim 72, wherein said plurality of carriages are operable to receive articles at said at least one induction station and to discharge articles to said plurality of discharge stations as said plurality of carriages are continuously moved along said conveying path.

76. A method of sorting articles with a crossbelt sorter, comprising:
   providing a crossbelt sortation system which comprises a plurality of carriages continuously movable along a conveying path, at least one induction station at said conveying path, and a plurality of destination stations at said conveying path, each of said plurality of carriages being adapted to carry side-by-side articles;
   operating said at least one induction station to move articles toward said plurality of carriages to position articles on said plurality of carriages in a same order in which the articles are received at said at least one induction station, wherein articles are positioned onto said plurality of carriages in a manner that reduces gridlock of articles on said plurality of carriages; and
   operating said plurality of carriages in order to discharge articles at desired destination stations.

77. The method of claim 76, wherein each of said plurality of carriages comprises at least two side by side carrier surfaces.

78. The method of claim 77, wherein said at least two side by side carrier surfaces comprise at least two side by side carrier belts.

79. The method of claim 77, wherein said at least two side by side carrier surfaces of each of said plurality of carriages are at least occasionally operable independently of one another.

80. The method of claim 76 including:
- determining an availability status of said plurality of carriages;
- determining a destination of an article at said induction station;
- comparing the availability status with the destination to determine compatibility of the article with said plurality of carriages; and
- selecting a compatible carriage for receiving the article.

81. The method of claim 76, wherein operating said at least one induction station includes limiting cell gridlock as a result of articles loaded onto said plurality of carriages.

82. The method of claim 76 including substantially continuously conveying said plurality of carriages along said conveying path.

83. The method of claim 82, wherein operating said at least one induction station includes operating said at least one induction station to move articles onto said plurality of carriages as said plurality of carriages are continuously moved past said at least one induction station.

84. The method of claim 83, wherein operating said plurality of carriages includes operating said plurality of carriages in order to discharge articles at desired destination stations as said plurality of carriages are continuously moved past said desired destination stations.

* * * * *

UNITED STATES PATENT AND TRADEMARK OFFICE
CERTIFICATE OF CORRECTION

PATENT NO. : 6,478,138 B1
DATED : November 12, 2002
INVENTOR(S) : Stuart M. Edwards, Artemio G. Affaticati and Claudio A. Cerutti It is certified that error appears in the above-identified patent and that said Letters Patent is hereby corrected as shown below:

Column 5,
Line 12, delete "12d" after "parcel".

Column 8,
Line 26, ":" should be -- . -- after "16"

Column 12,
Line 1, insert -- ( -- before "Ser."
Line 23, "A method of sorting articles" should be -- A crossbelt sortation system --

Column 13,
Line 49, "sot" should be -- sorting --

Column 15,
Line 15, "sad" should be -- said --

Column 18,
Line 38, "sad" should be -- said --

Signed and Sealed this

Thirtieth Day of December, 2003

JAMES E. ROGAN
*Director of the United States Patent and Trademark Office*